E. N. MOOR.
TOOL HOLDER FOR LATHES.
APPLICATION FILED AUG. 30, 1915.
1,219,841.
Patented Mar. 20, 1917.
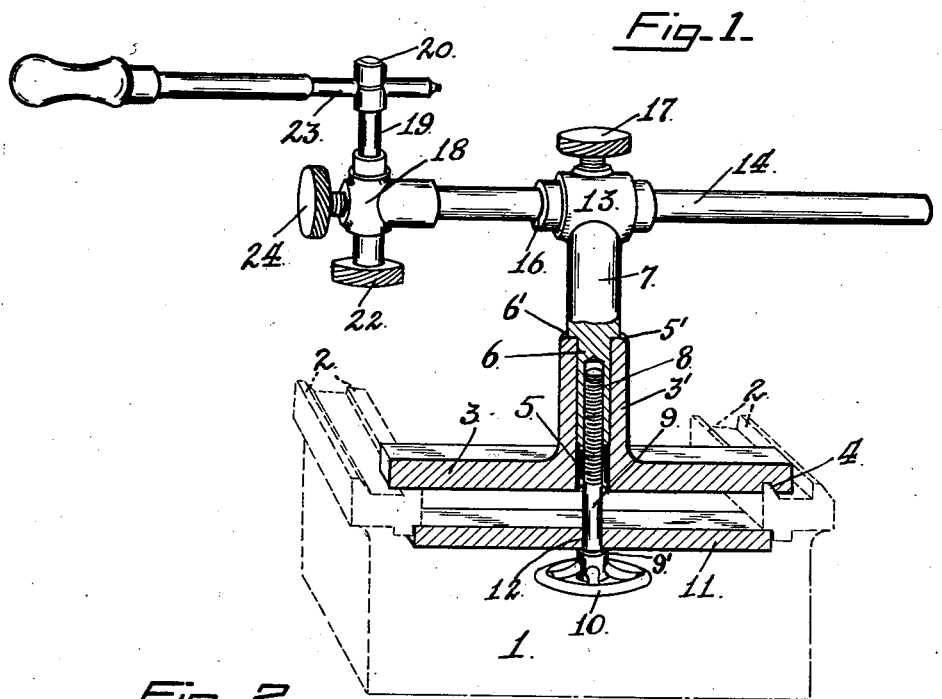
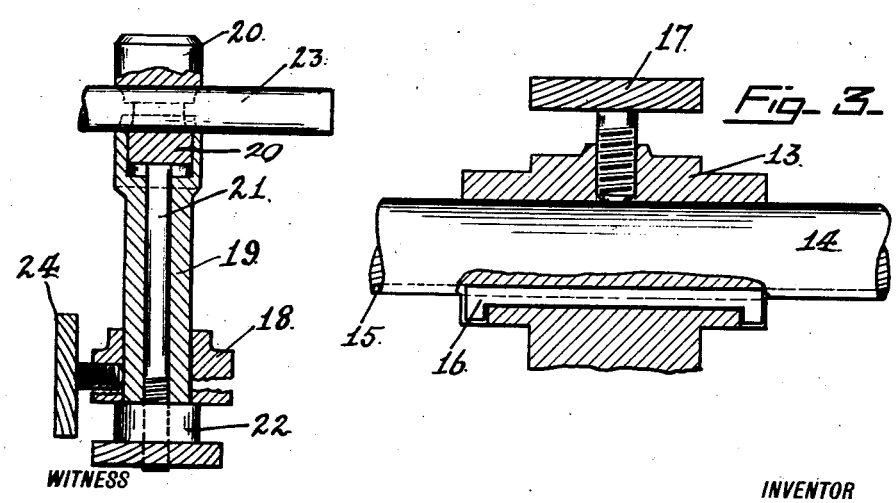
WITNESS
Wm F. Drew
INVENTOR
Edward N. Moor
BY
Am F. Booth
ATTORNEY

UNITED STATES PATENT OFFICE.

EDWARD N. MOOR, OF OAKLAND, CALIFORNIA.

TOOL-HOLDER FOR LATHES.

1,219,841.  Specification of Letters Patent.  Patented Mar. 20, 1917.

Application filed August 30, 1915. Serial No. 47,983.

*To all whom it may concern:*

Be it known that I, EDWARD N. MOOR, a citizen of the United States, residing at Oakland, in the county of Alameda and State of California, have invented certain new and useful Improvements in Tool-Holders for Lathes, of which the following is a specification.

My invention relates to the class of tool-holders for lathes, and more particularly to an adjustable auxiliary device for holding stationary tools in lathes.

When a grinding attachment is used on a lathe, and mounted upon the regular lathe carriage, it is of great advantage to have an auxiliary tool-holder for supporting a grinding-wheel truing-tool, or a locating finger, or the like. For instance, if a truing-tool is held in a fixed position in proximity to the work to be ground, the grinding-wheel can be run across said tool, by means of the carriage, after each cut, or as often as may be necessary, without changing the position of the grinder on said carriage, or without changing the position of the work or the truing-tool in the lathe, thereby effecting a considerable saving of time.

The object of my invention, therefore, is to provide an adjustable auxiliary stationary tool-holder for lathes, which is adapted for use primarily with grinding attachments.

To this end my invention consists in the novel device hereinafter described with reference to the accompanying drawings, in which—

Figure 1 is a part-sectional elevation of my tool-holder, showing the method of its attachment to a horizontal lathe-bed.

Fig. 2 is a part-sectional enlarged detail of the tool-post proper.

Fig. 3 is a part-sectional enlarged detail of the head 13 of the supporting column 7.

In the drawings,—1 represents the bed of a horizontal lathe of the usual type, having guides 2. My tool-holder is supported by a T-shaped base member 3 adapted to lie across the bed 1 of the lathe, and provided with a notch 4 for engagement with one of the guides 2. The upright portion or stem 3' of the member 3 is centrally bored at 5 to receive the cylindrical shank 6 of the supporting column 7, said column 7 being formed with a shoulder 6' at the upper end of the shank 6. This shank 6 is interiorly threaded at 8 to receive a clamping screw 9 provided with a hand wheel 10 at its lower end. A clamping bar 11, adapted to bear against the under side of the guide ways 2, is provided with a hole 12 through which the clamping screw 9 extends, a shoulder 9' on said screw 9 engaging said clamping bar 11. By tightening the screw 9, the shoulder 6' of the column 7 is drawn down against the end 5' of the upright stem portion 3' of the member 3, and the whole structure is thus firmly clamped upon the bed 1.

The column 7 carries at its upper end a transverse cylindrical head 13 in which is slidably mounted a horizontal rod 14. A key way 15 in said rod 14, as seen in Fig. 3, is engaged by a key 16 in the head 13, whereby said rod 14 is prevented from turning.

Suitable means are provided for clamping the rod 14 in the head 13, as, for example, a set screw 17. The rod 14 carries upon one end a vertically bored head 18, in which is slidably and rotatably mounted the tool-post proper, which consists of a sleeve 19, Fig. 2 of the drawings, a head 20, provided with a shank 21 extending through said sleeve 19, and a nut 22 screwed upon the lower end of said shank 21 for clamping a tool 23 between said head 20 and the upper end of said sleeve 19. Suitable means are provided for clamping the sleeve 19 in the vertical head 18, as, for example, a set screw 24.

It will be clearly seen from the drawings and the above description that the tool 23 may be set in any desired position. The clamping members 3 and 11 may be set anywhere on the lathe bed 1; the supporting column 7 is rotatably adjustable in the stem 3' of the base member 3; the rod 14 is horizontally adjustable in the head 13; the tool-post is both horizontally and vertically adjustable in the head 18; and the tool 23 is rotatably and slidably adjustable in the tool-post.

In Fig. 1 of the drawings, the tool 23 is represented as a diamond-point truing-tool for grinding-wheels, and may be used as hereinbefore explained. Other uses for my auxiliary tool-holder will suggest themselves to anyone skilled in the use of such appliances.

I claim:—

1. An adjustable tool holder for lathes comprising a base adapted to be clamped to a lathe bed, a vertically disposed supporting column secured for adjustable rotation on said base, means for retaining the supporting column in its adjusted position and the base upon the lathe bed comprising a single fastening device, and means carried by the column for adjustably supporting a tool holder, substantially as described.

2. An adjustable tool holder for lathes comprising a base member adapted to rest transversely upon a lathe bed and bridge the guides thereof, a clamping bar beneath said base member and adapted to bridge the under side of said guides, a supporting column having an internal aperture therein carried by the base member and capable of a rotary adjustment, a screw engaging the walls of the aperture in said column and passing through the base member and the clamping bar for clamping the base to the bed, and the column to the face, and means carried by the supporting column for adjustably supporting a tool, substantially as described.

3. An adjustable tool holder for lathes comprising a base member adapted to rest upon a lathe bed, and bridge the guides thereof, said member having a hollow cylindrical upward extension, clamping means disposed beneath said base member and coöperating with the lathe bed, a supporting column having an internally threaded cylindrical lower portion adapted to fit within the hollow extension within the base member and capable of a rotary movement, a screw extending downwardly from said threaded portion and engaging the clamping means and the base for retaining the base and column in position, and tool supporting means carried by said adjustable column, substantially as described.

4. An adjustable tool holder for lathes comprising a base member adapted to rest upon a lathe bed and bridge the guides thereof, said member having a hollow cylindrical vertical extension, a spaced clamping bar beneath said member adapted to bridge and engage the under side of said guides, a supporting column having an internally threaded cylindrical lower portion adapted to fit within the hollow extension of the base member and capable of a rotary adjustment, a clamping screw extending downwardly from said threaded portion and passing through said clamping bar for clamping the column and base together and for clamping said base and bar upon the lathe bed, and horizontally adjustable tool supporting means carried by said column, substantially as described.

5. An adjustable tool holder for lathes comprising a base adapted to be clamped upon a lathe bed, a supporting column adjustably secured to said base and interfitted with a portion thereof, clamping means underlying the base and coöperating with the lathe bed, and a single fastening device engaging the column and retaining the same in its adjusted position to the base, and fastening the base and clamping means to the lathe bed, and tool supporting means carried by said adjustable column, substantially as described.

In testimony whereof I have signed my name to this specification in the presence of two subscribing witnesses.

EDWARD N. MOOR.

Witnesses:
Wm. F. Booth,
D. B. Richards.